(12) United States Patent
Kadowaki et al.

(10) Patent No.: US 8,907,815 B2
(45) Date of Patent: Dec. 9, 2014

(54) PARKING SUPPORT DEVICE

(75) Inventors: Jun Kadowaki, Kariya (JP); Kazuya Watanabe, Anjo (JP); Takashi Yamanaka, Chita (JP); Yumi Yamanaka, legal representative, Chita (JP)

(73) Assignee: Aisin Kabushiki Kaisha, Aichi-ken (JP)

( * ) Notice: Subject to any disclaimer, the term of this patent is extended or adjusted under 35 U.S.C. 154(b) by 630 days.

(21) Appl. No.: 12/934,002

(22) PCT Filed: May 8, 2009

(86) PCT No.: PCT/JP2009/058688
§ 371 (c)(1),
(2), (4) Date: Dec. 10, 2010

(87) PCT Pub. No.: WO2009/147920
PCT Pub. Date: Dec. 10, 2009

(65) Prior Publication Data
US 2011/0102196 A1 May 5, 2011

(30) Foreign Application Priority Data
Jun. 3, 2008 (JP) ................................. 2008-146096

(51) Int. Cl.
*B60Q 1/48* (2006.01)
*B62D 15/02* (2006.01)

(52) U.S. Cl.
CPC .................................. *B62D 15/0275* (2013.01)
USPC ........ 340/932.2; 340/435; 340/437; 340/901; 348/333.03; 348/148; 180/199

(58) Field of Classification Search
USPC .......... 340/932.2, 435, 437, 901; 348/333.03, 348/148, 113, 118, 119; 180/199, 204
See application file for complete search history.

(56) References Cited

U.S. PATENT DOCUMENTS 6,487,481 B2 11/2002 Tanaka et al.
6,567,726 B2 5/2003 Sakiyama et al.
(Continued)

FOREIGN PATENT DOCUMENTS

EP 1 253 065 A2 10/2002
EP 1 308 346 A2 5/2003
(Continued)

OTHER PUBLICATIONS

Korean Office Action dated Jul. 17, 2012 issued in Korean Patent Application No. 1020107021231.
(Continued)

*Primary Examiner* — Steven Lim
*Assistant Examiner* — Hongmin Fan
(74) *Attorney, Agent, or Firm* — Sughrue Mion, PLLC

(57) ABSTRACT

A parking support device capable of reliably supporting a parking driving operation by a driver, comprising an image acquisition portion for acquiring an image peripheral to a vehicle captured by a vehicle-mounted image pickup device; an image display portion for displaying the peripheral image; and an indicator output portion for superimposedly displaying an indicator, comprising a pair of left and right vehicle width extension lines extending rearwards of the vehicle, on the peripheral image in order to guide a driver during a parking operation by the driver. The parking support device supports parallel parking, comprising a first turning step, in which the vehicle is reversed while being turned and driven into a parking area, and a second turning step, in which the vehicle is aligned in a parallel direction while being turned in a direction opposite to that in the first turning step. The indicator output portion superimposedly displays, during the second turning step, only the vehicle width extension line that is on an outside of the turn.

4 Claims, 11 Drawing Sheets

(56) References Cited

U.S. PATENT DOCUMENTS

| | | | |
|---|---|---|---|
| 6,825,880 B2 | 11/2004 | Asahi et al. | |
| 6,940,423 B2 | 9/2005 | Takagi et al. | |
| 6,999,002 B2 | 2/2006 | Mizusawa et al. | |
| 7,012,549 B2 | 3/2006 | Mizusawa et al. | |
| 7,706,943 B2 | 4/2010 | Shimazaki | |
| 7,812,741 B2 | 10/2010 | Sakakibara | |
| 7,825,828 B2 | 11/2010 | Watanabe et al. | |
| 2001/0030688 A1* | 10/2001 | Asahi et al. | 348/118 |
| 2003/0030724 A1 | 2/2003 | Okamoto | |
| 2003/0080877 A1* | 5/2003 | Takagi et al. | 340/932.2 |
| 2004/0130464 A1* | 7/2004 | Schindler et al. | 340/932.2 |
| 2007/0112490 A1 | 5/2007 | Mizusawa | |
| 2008/0158011 A1* | 7/2008 | Yamanaka | 340/932.2 |

FOREIGN PATENT DOCUMENTS

| | | |
|---|---|---|
| JP | 2001-180405 A | 7/2001 |
| JP | 2001-191877 A | 7/2001 |
| JP | 2001-334899 A | 12/2001 |
| JP | 2003-11762 A | 1/2003 |
| JP | 2003-54340 A | 2/2003 |
| JP | 2003-137051 A | 5/2003 |
| JP | 2003-291759 A | 10/2003 |
| JP | 2004-123057 A | 4/2004 |
| JP | 2004-203365 A | 7/2004 |
| JP | 2004-243835 A | 9/2004 |
| JP | 2005-306335 A | 11/2005 |
| JP | 2007-98979 A | 4/2007 |
| JP | 2007-137171 A | 6/2007 |
| JP | 2008-120293 A | 5/2008 |
| JP | 2008-132881 A | 6/2008 |
| KR | 1020040038880 A | 5/2004 |
| WO | 2005/108171 A1 | 11/2005 |

OTHER PUBLICATIONS

International Preliminary Report on Patentability issued in PCT/JP2009/058688 dated Jan. 20, 2011 (8 pages).

European Search Report issued in European Application No. 09758187.0 dated Jun. 17, 2011.

International Search Report dated Jun. 2, 2009 (with translation) (4 pages).

Japanese Office Action issued in Japanese Application No. 2008-146096 dated Dec. 20, 2012.

* cited by examiner

PARKING SUPPORT DEVICE

TECHNICAL FIELD

The present invention relates to a parking support device that can support driving operation by a driver when parking a vehicle.

BACKGROUND ART

There are known parking support devices that can reduce the burden on a driver when parking a vehicle. In Patent Reference 1, mentioned below, there is described a parking support device that displays, superimposed on an image peripheral to a vehicle captured by a vehicle-mounted camera, a pair of rear projection lines that show a projected trajectory of a rear end of the vehicle according to a steering angle of the reversing vehicle, a pair of vehicle width extension lines extending rearward of the vehicle irrespective of the steering angle of the vehicle, or another indicator; and uses such indicators as well as an audible element to support a driving operation by a driver when parking.

PRIOR ART REFERENCE

Patent Reference

[Patent Reference 1] Japanese Laid-open Patent Application No. 2001-334899

DISCLOSURE OF THE INVENTION

Problems that the Invention is Intended to Solve

However, in the parking support device described above, depending on the progress of the parking operation, indicators that are not necessarily required are superimposed and displayed. Therefore, there are instances in which the amount of information provided to the driver becomes excessive, an indicator that requires attention is more difficult to recognize, and the driving operation is not necessarily supported in an effective manner.

Also, since the indicators are displayed superimposed on the image peripheral to the vehicle, there are instances in which an unnecessary indicator hides the peripheral image, making it difficult to visually observe the image peripheral to the vehicle.

The problems described above become more significant for an indicator displayed using a thicker line or otherwise made more prominent in order to facilitate visual observation of the indicator.

With the above-mentioned problems in view, it is an object of the present invention to provide a parking support device that can support the operation of parking by a driver in a reliable manner.

Means for Solving the Problems

In order to solve the above-mentioned problems, a configuration of a parking support device according to the present invention is characterised in comprising an image acquisition portion for acquiring an image peripheral to a vehicle captured by a vehicle-mounted image pickup device; an image display portion, provided within a vehicle chamber, for displaying the peripheral image; and an indicator output portion for generating, in accordance with a driving operation step, an indicator comprising a pair of left and right vehicle width extension lines extending rearwards of the vehicle, and for superimposedly displaying the indicator on the peripheral image, in order to guide a driver during a parking operation by the driver; the parking support device supporting parallel parking, comprising a first turning step, in which the vehicle is reversed while being turned and caused to enter a parking area, and a second turning step, in which the vehicle is aligned in a parallel direction while being turned in a direction opposite to that in the first turning step; the indicator output portion superimposedly displaying, during the second turning step, only the vehicle width extension line that is on an outside of the turn out of the vehicle width extension lines.

Normally, when parallel parking is being performed, there exists, on an outside of the turn during the second turning step, a wall, a hard shoulder, or a similar reference for determining a parallel direction; and a driver aligns the vehicle to the reference to align the vehicle with the parallel direction. Therefore, in an instance where the driver references a superimposedly displayed vehicle width extension line and aligns the vehicle to the parallel direction, it is preferable that the driver references the vehicle width extension line on the outside of the turn, nearer the reference. However, in an instance where a pair of left and right vehicle width extension lines are superimposedly displayed, it is not clear which of the left and right vehicle width extension lines needs to be referenced. In an instance such as that according to the present configuration in which, out of the left and right vehicle width extension lines, only the vehicle width extension line that is on the outside of the turn during the second turning step is superimposedly displayed, and the indicator that needs to be referenced is thereby made clearer to the driver. Also, there is a reduction in the number of indicators displayed superimposed on the image peripheral to the vehicle, and the region of the peripheral image that is covered by the indicators thereby becomes smaller. Therefore, it is possible to prevent any reduction in the ability of the peripheral image to be observed. As a result, it is possible to provide a parking support device that can support a driving operation in an effective manner.

Another aspect is characterised in comprising an image acquisition portion for acquiring an image peripheral to a vehicle captured by a vehicle-mounted image pickup device; an image display portion, provided within a vehicle chamber, for displaying the peripheral image; and an indicator output portion for generating, in accordance with a driving operation step, an indicator comprising a vehicle width extension line extending rearwards of the vehicle and a rear projection line extending in a direction in which the vehicle is projected to travel, and for superimposedly displaying the indicator on the peripheral image, in order to guide a driver during a parking operation by the driver; the parking support device supporting perpendicular parking, comprising a turn-reversing step in which the vehicle is reversed while being turned and aligned to a perpendicular direction, and a linear reversing step in which the vehicle is reversed in a straight line and driven into a parking area; the indicator output portion superimposedly displaying only the rear projection line out of the rear projection line and the vehicle width extension line during the turn-reversing step, and superimposedly displaying only the vehicle width extension line out of the rear projection line and the vehicle width extension line during the linear reversing step.

When perpendicular parking is being performed, during the turn-reversing step, there is a need to reverse the vehicle while adjusting the steering angle to align the vehicle to a direction of perpendicular parking, and the driver must identify a relationship between the steering angle and a path of the vehicle. Therefore, adjusting the steering angle while referencing the rear projection line in portionicular out of the indicators makes it possible to perform the turn-reversing step in a reliable manner. During a linear reversing step, it is necessary to reverse the vehicle while ensuring that the vehicle is being contained in the parking area. Therefore, reversing the vehicle while referencing the vehicle width extension line in portionicular out of the indicators makes it possible to perform the linear reversing step in a reliable manner. However, in an instance where both of the rear projection line and the vehicle width extension line are superimposedly displayed as indicators regardless of the step being performed, it is not clear which of the indicators needs to be referenced during each of the steps. In an instance such as that according to the present configuration in which only the rear projection line is superimposedly displayed during the turn-reversing step and only the vehicle width extension line is superimposedly displayed during the linear reversing step, the indicator that needs to be referenced is thereby made clearer. Also, there is a reduction in the number of indicators displayed superimposed on the image peripheral to the vehicle, and the region of the peripheral image that is covered by the indicators thereby becomes smaller. Therefore, it is possible to prevent any reduction in the ability of the peripheral image to be observed. As a result, it is possible to provide a parking support device that can support a driving operation in an effective manner.

Another aspect is characterised in that the indicator output portion switches between superimposedly displayed indicators based on a steering angle of the vehicle.

The first turning step and the second turning step, or the turn-reversing step and the linear reversing step, can be distinguished from each other from a difference in the steering angle. Therefore, switching between the superimposedly displayed steering angles based on the steering angle, as in the present configuration, makes it possible to display the respective indicator that needs to be referenced during each of the steps in a reliable manner.

Another aspect is characterized in that the indicator output portion switches between displaying the rear projection line and displaying the vehicle width extension line based on a relative angle between the vehicle and a parking area line demarcating a parking area.

Normally, a parking area for perpendicular parking has a parking area line, and the relative angle between the vehicle and the parking area line varies between before and after the turn-reversing step. Switching between displaying the rear projection line and displaying the vehicle width extension line based on the relative angle between the vehicle and the parking area line, as in the present configuration, makes it possible to display the respective indicator that needs to be referenced during each of the steps in a reliable manner.

The indicator output portion can also be configured so as to not superimposedly display the vehicle width extension line among the pair of left and right vehicle width extension lines that is on an inside of a turn.

In an instance described above in which only the vehicle width extension line that is on the outside of the turn is superimposedly displayed, the superimposedly displayed vehicle width extension line on the outside of the turn is made more noticeable to the driver, and the indicator that needs to be referenced is made clearer to the driver. Also, there is a reduction in the number of indicators displayed superimposed on the image peripheral to the vehicle, and the region of the peripheral image that is covered by the indicators thereby becomes smaller. Therefore, it is possible to prevent any reduction in the ability of the peripheral image to be observed.

As a result, it is possible to provide a parking support device that can support a driving operation in an effective manner.

The indicator output portion can be configured to superimposedly display, in addition to the above-described vehicle width extension line on the outside of the turn, a rear projection line extending in a direction in which the vehicle is projected to travel.

In an instance where the rear projection line is superimposedly displayed, the driver is able to clearly identify a positional relationship with an obstacle or another object present in the vicinity of the reversing vehicle. Therefore, the driver can adjust the parking position of the vehicle by performing a steering or brake pedal operation according to necessity.

BEST MODE FOR CARRYING OUT THE INVENTION

First Embodiment

Figure 1:
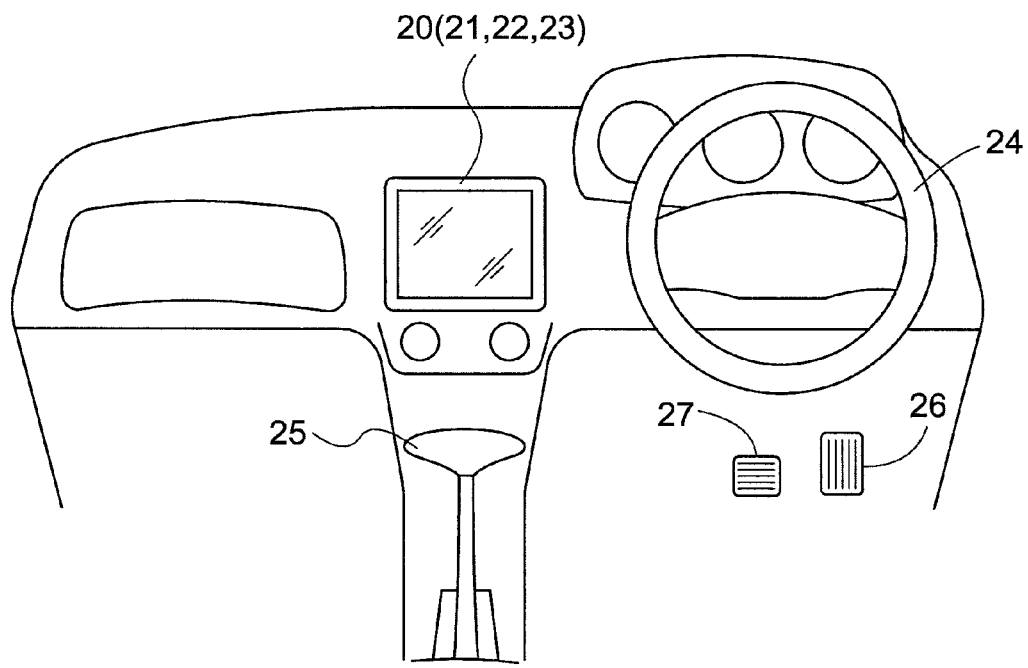
FIG. 1 is a drawing showing a front of a driving seat of a vehicle.
Figure 2:
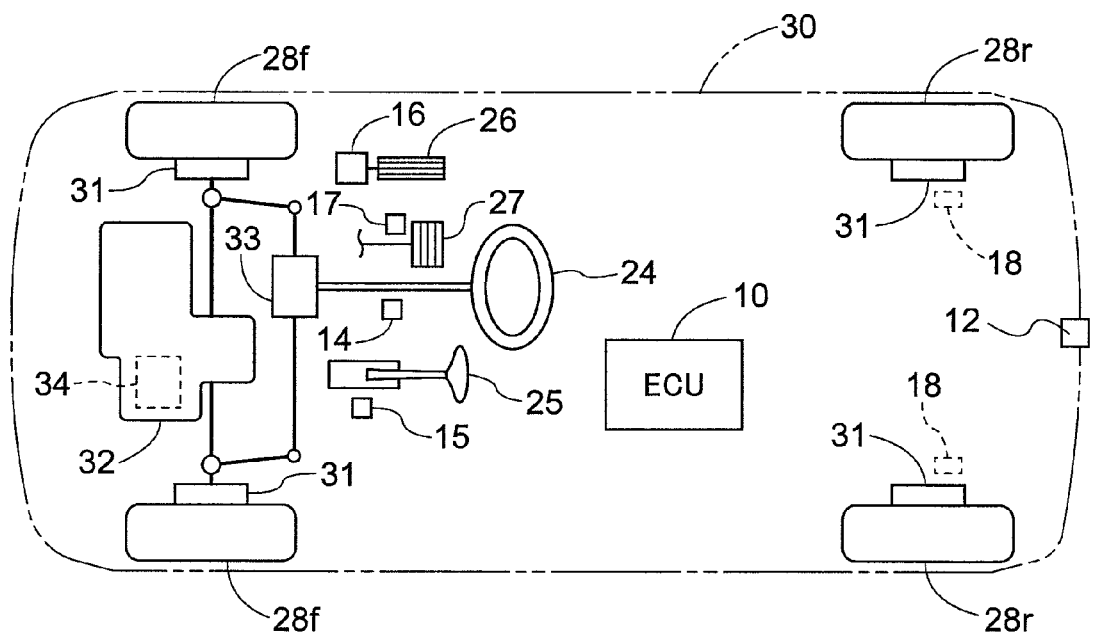
FIG. 2 is a block diagram showing a basic configuration of the vehicle.

An embodiment of the present invention will now be described with reference to the drawings. FIGS. 1 and 2 show a basic configuration of a vehicle 30. A steering device 24 provided to a driving seat interlocks with a power steering unit 33 and transmits a rotation operation force to front wheels 28f to steer the vehicle 30. The front wheels 28f correspond to steered wheels in the present invention. A front portion of a vehicle body is provided with an engine 32, and a transmission mechanism 34 having a torque converter, a CVT, or another transmission for converting power from the engine 32 and transmitting the converted power to the front wheels 28f or rear wheels 28r. Power is transmitted to one or both of the front wheels 28f and the rear wheels 28r depending on the method of driving the vehicle 30 (i.e., front wheel drive, rear wheel drive, four wheel drive). An accelerator pedal 26, constituting accelerator operating means for controlling the speed of travel, and a brake pedal 27 for applying a braking force onto the front wheels 28f and the rear wheels 28r via a brake device 31 for each of the front wheels 28f and the rear wheels 28r, are provided in parallel in the vicinity of the driving seat.

A monitor 20 (i.e., a display device), comprising a touch panel 23 formed on a display portion 21, is provided at a position on an upper portion of a console in the vicinity of the driving seat. In the present embodiment, the monitor 20 is of a liquid crystal type provided with a back light. A speaker 22 is provided to the monitor 20. The touch panel 23 is of a pressure sensitive type or an electrostatic type, and outputs location data representing a position of contact with a finger or another object. As described further below, in the present embodiment, the touch panel 23 of the monitor 20 is used as means for inputting an instruction to initiate parking support. In an instance in which the vehicle has a navigation system, the monitor 20 is preferably one that is also used as a display device for the navigation system.

The monitor 20 may also be of a plasma display type or a CRT type, and the speaker 22 may be provided to an inside of a door or another location. In an instance where there is provided a switch or other means for inputting an instruction to initiate parking support, the touch panel 23 of the monitor 20 need not necessarily be used as the means for inputting an instruction to initiate parking support.

A steering sensor 14 is provided to an operating system for the steering device 24 and a direction and amount of steering operation are measured. A shift position sensor 15 is provided to an operating system for a shift lever 25 and a shift position is determined. An accelerator sensor 16 is provided to an operating system for the accelerator pedal 26 and the amount of operation is measured. A brake sensor 17 is provided to an operating system for the brake pedal 27 and a braking operation or other action is detected.

A rotation sensor 18 for measuring the amount of rotation of at least one of the front wheels 28f and the rear wheels 28r is provided as a travel distance sensor. The present embodiment shows an example in which the rotation sensor 18 is provided to the rear wheels 28r. With regards to the travel distance, the amount of travel of the vehicle 30 may also be measured at the transmission mechanism 34 from the amount of rotation of a driving system. The vehicle 30 is also provided with an ECU (electronic control unit) 10, which is a core of the parking support device according to the present invention, for performing movement control including parking support.

A camera 12 for capturing an image of a view behind the vehicle 30 is provided to a rear portion of the vehicle 30. The camera 12 is a digital camera, installed with a CCD (charged coupled device), a CIS (CMOS image sensor), or another image-capturing element, for outputting information captured by the image-capturing element as video information in real time. The camera 12 is provided with a wide-angle lens and has a field angle of, for example, about 140° from left to right. The camera 12 is provided so as to be oriented rearwards of the vehicle 30 at an angle of depression of, for example, about 30° and captures an image of a region up to about 8 meters behind the vehicle. The captured image is inputted into the ECU 10 and used for parking support or a similar use.

Figure 3:
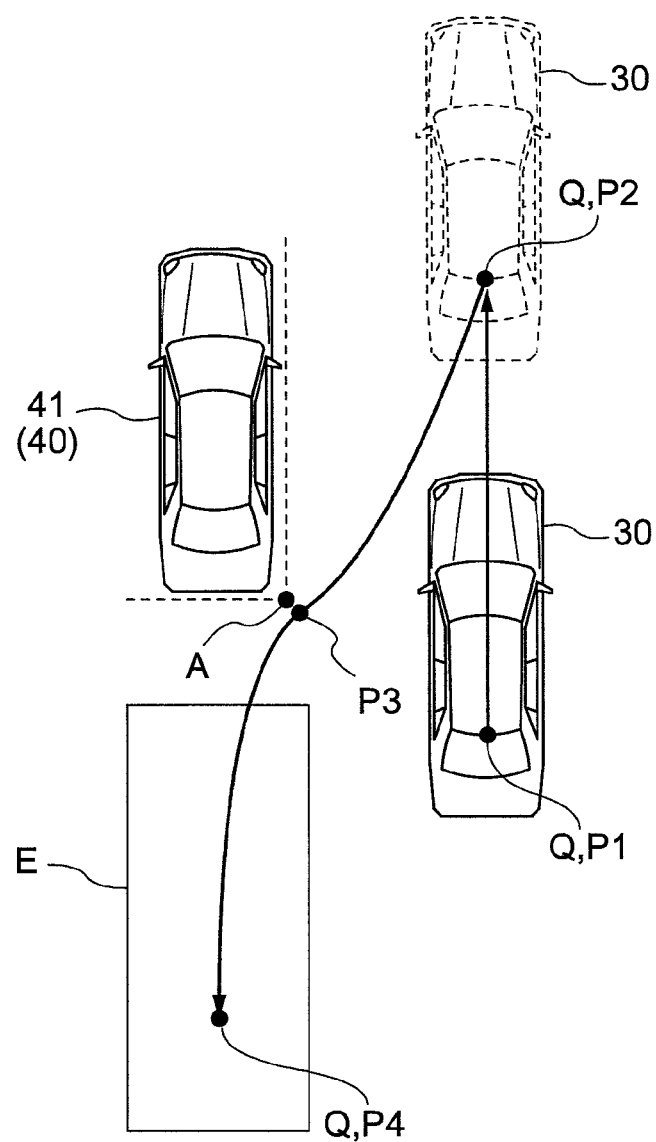
FIG. 3 is a drawing showing a trajectory of movement during parallel parking.

A parking support device according to the present embodiment configured with the ECU 10 at the core performs parking support during, for example, parallel parking in a parking space E between two parked vehicles 40 (i.e., 41 and 42), as shown in FIG. 3. The vehicle 30 is made to advance past a side of the parking space E; reversed, during which the direction of steering is turned back; and parked in the parking space E. Using substantially a center portion of an axis of the rear wheel 28r of the vehicle 30 as a reference point Q of the vehicle 30, the ECU 10 calculates a guidance path for the vehicle 30 and supports an operation of parking in the parking space E. In other words, parallel parking is supported by the ECU 10 so that the vehicle 30 is caused to advance from point P1 to point P2 and reversed starting from point P2, which is a reversing start position; the steering device 24 is turned back at point P3, which is a steering turn-back position; and parking is completed at point P4, which is a parking target position. The ECU 10 calculates a guidance path between the reversing start position P2 and the parking target position P4 with a steering angle that remains constant during movement from the reversing start position P2 to the steering turn-back position P3 and during movement from the steering turn-back position P3 to the parking target position P4.

Point A in the drawing shows a position in which the vehicle 30 moving from the reversing start position P2 while turning does not come into contact with an obstacle in front of the vehicle 30. In the example shown in FIG. 3, the obstacle in front of the vehicle 30 is the parked vehicle 41, and a right rear end portion of the parked vehicle 41 adjacent to the vehicle 30 at the reversing start position P2 corresponds substantially to point A. The ECU 10 calculates an appropriate position for the reversing start position P2 from a relationship with point A so that contact with the parked vehicle 41 is avoided.

Figure 4:
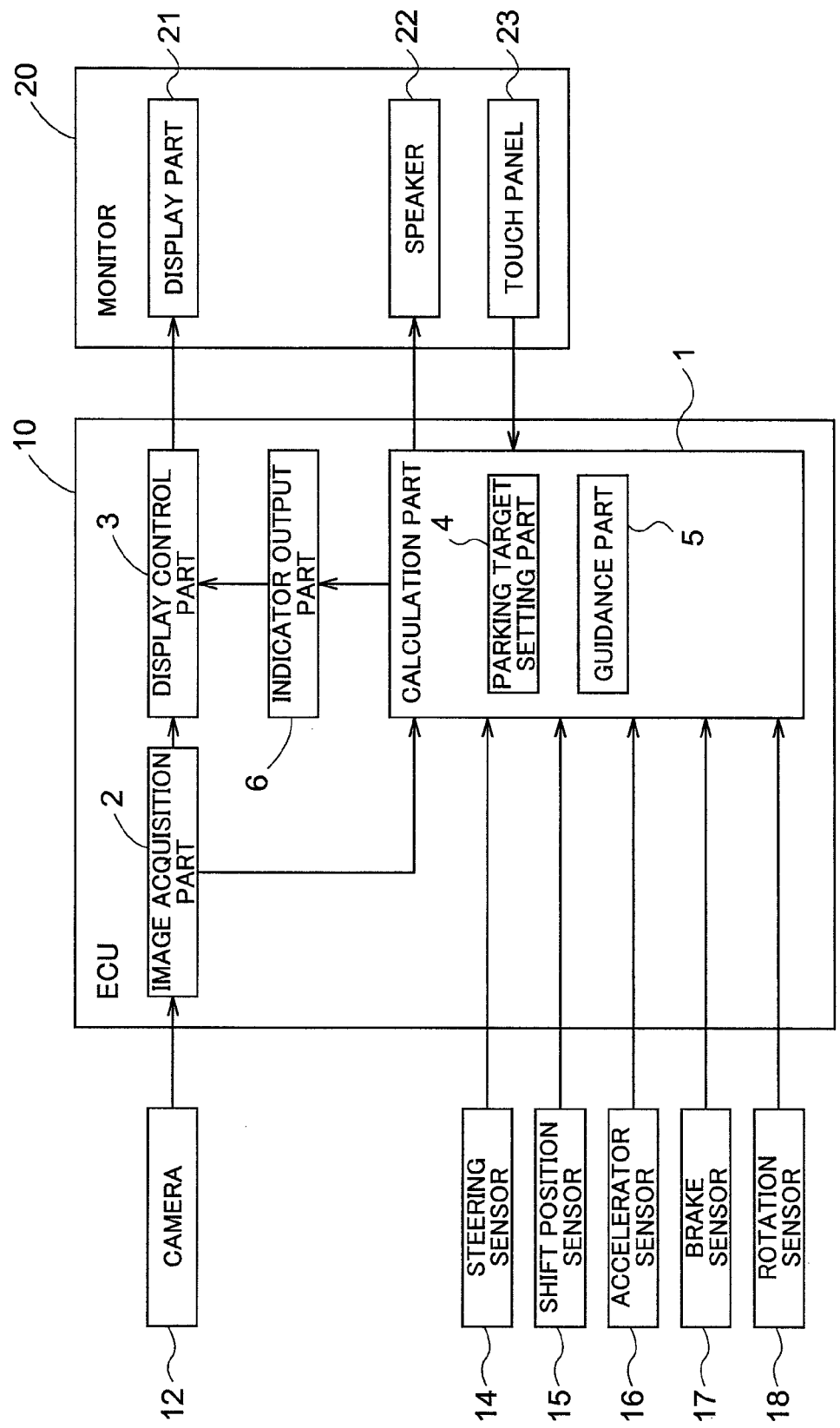
FIG. 4 is a schematic block diagram showing an example of configuration of the parking support device.

FIG. 4 is a schematic block diagram showing an example of configuration of the parking support device according to the present invention having the ECU 10 as a core. As shown in the drawing, the ECU 10 is configured so as to have a calculation portion 1, an image acquisition portion 2, a display control portion 3, an indicator output portion 6, and other functional portions. The calculation portion 1 is a functional portion for calculating a guidance path, described above with reference to FIG. 3, and other results; and has a parking target setting portion 4, a guidance portion 5, and similar functional portions. Each of the above-mentioned functional portions provided to the ECU 10 is based around a microcomputer, a DSP (digital signal processor), or other arithmetic logic hardware, and is realized through an interaction with software such as a program executed within the hardware. Therefore, each of the functional portions represents an allocation of functions, and need not be configured so as to be physically independent. The ECU 10 also includes a frame memory device, for storing an image, or a variety of other types of memory devices; as well as an image processing circuit or a variety of other types of electronic circuits. The configuration and function of the variety of types of memory devices and electronic circuits are known, and a drawing and a detailed description are therefore omitted herein.

The image acquisition portion 2 is a functional portion for acquiring an image peripheral to the vehicle 30, captured by the camera 12 (i.e., vehicle-mounted image pickup device).

The image acquisition portion 2 is configured so as to have a frame memory device for storing an image, a synchronizing separator circuit, and other portions. The display control portion 3 is a functional portion for displaying the image peripheral to the vehicle 30 captured by the camera 12 on the monitor 20 (i.e., the display device) in a vehicle chamber. The display control portion 3 superimposes an indicator for guiding a driver as described further below onto the peripheral image.

The calculation portion 1 sets the parking target position P4 of the vehicle 30 and calculates a guidance path to the parking target position P4. The parking target setting portion 4 provided to the calculation portion 1 is a functional portion for setting the parking target position P4 of the vehicle 30. The guidance portion 5 provided to the calculation portion 1 is a functional portion for calculating a guidance path to the parking target position P4. Detection results from the steering sensor 14, the shift position sensor 15, the accelerator sensor 16, the brake sensor 17, the rotation sensor 18, and other sensors are inputted into the calculation portion 1. The calculation portion 1 calculates the parking target position P4 and the guidance path based on the detection results.

In an instance where the parking support device is used, the driver performs a plurality of driving operation steps, and the vehicle 30 is thereby made to follow the guidance route and parked in the parking target position P4. The indicator output portion 6 generates, in accordance with the step, an indicator for guiding the driver during parking, and displays the indicator, via the display control portion 3, superimposed on the peripheral image.

Figure 5:
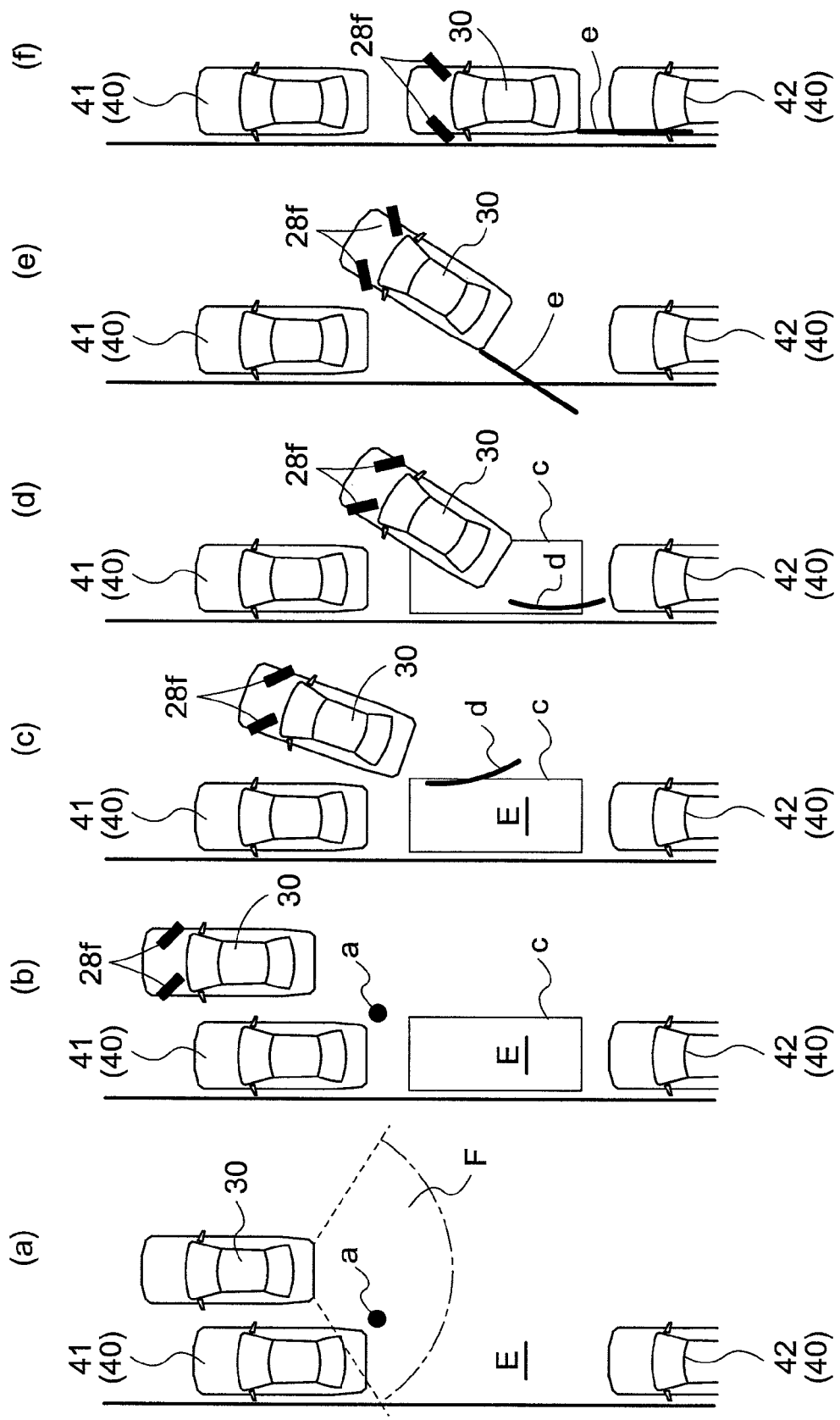
FIG. 5 is a process diagram showing steps of parallel parking supported by the parking support device.

Although a detailed description is given further below, a broad parallel parking procedure guided by the parking support device according to the present embodiment will now be described with reference to FIG. 5.

[First Step]

In order to reverse the vehicle 30 to perform parallel parking, the driver causes the vehicle 30 to advance until the parking space E enters an image capture range F of the camera 12 provided to a rear of the vehicle 30, and stops the vehicle. It is difficult to cause the vehicle 30 to stop so as to coincide with the reversing start position P2 shown in FIG. 3. Therefore, the driver initially advances the vehicle over the reversing start position P2 and activates the parking support device, then reverses the vehicle 30 to the reversing start position P2 while referencing an indicator a (i.e., a vertical indicator) shown in FIG. 5(a).

[Second Step]

The driver operates the steering device 24 while keeping the vehicle 30 stationary at the reversing start position P2, moves an indicator c (i.e., a parking area line) shown in FIG. 5(b) so that the indicator c is contained within the parking space E, and sets the parking target position P4. At the same time, operation of the steering device 24 sets the front wheels 28f, which are steered wheels, at a steering angle at which parallel parking is initiated.

The distance in the lateral direction between the parking space E and the vehicle 30 may vary according to the driver. The geometrical relationship between the reversing start position P2 and the parking space E in the longitudinal direction of the vehicle 30 is adjusted by the first step to an appropriate position. The geometrical relationship between the reversing start position P2 and the parking space E in a lateral direction of the vehicle 30 varies according to the driver, and is therefore adjusted in the second step. During the second step, the parking area line c is set to within the parking space E. Therefore, the ECU 10 is able to determine the parking target position P4. When the reversing start position P2 and the parking target position P4 have been determined, the ECU 10 is able to determine the guide path and the steering turn-back position P3.

Setting of the reversing start position P2, the parking target position P4 (i.e., the parking area line c), the guidance path, and the steering turn-back position P3 in the first and second steps are performed by the parking target setting portion 4 and the guidance portion 5 of the calculation portion 1 working in coordination. The setting may be performed in a sequence in which the guidance path and the steering turn-back position are set after the reversing start position P2 and the parking target position P4 have been determined, or in a reverse sequence. In other words, with respect to the reversing start position P2, the parking target position P4 may be set while positions to which the vehicle 30 can be guided to are calculated.

[Third Step]

The driver reverses the vehicle 30, maintaining the steering angle set during the second step while referencing an indicator d (i.e., a steering turn-back line), as shown in FIG. 5(c). FIG. 5(d) described below shows a state in which the vehicle 30 is near or at a point of completing the reversal during which the steering angle set during the second step is maintained, or, in other words, the vehicle 30 has reached the steering turn-back position P3 or the vicinity thereof. FIG. 5(c) shows a step in which the driver is performing a driving operation in which the vehicle 30 is reversed between the reversing start position P2 and the steering turn-back position P3.

[Fourth Step]

Once the driver reverses the vehicle 30, maintaining the steering angle set during the second step while referencing the steering turn-back line d, until a predetermined position (i.e., the steering turn-back position P3) is reached as shown in FIG. 5(d), the driver stops the vehicle 30. Specifically, when the vehicle 30 is reversed until the steering turn-back line d reaches a far side of the parking area line c, in other words, a position corresponding to a hard shoulder, the driver presses down on the brake pedal 27 and stops the vehicle 30. The third and fourth steps correspond to the first turning step of the present invention.

[Fifth Step]

While keeping the vehicle 30 stationary at the position at which it stopped in the fourth step (i.e., the steering turn-back position P3), the driver operates the steering device 24 and turns back the steering until the steering angle is at substantially a maximum in a reverse direction as shown in FIG. 5(e). In other words, a steering angle for after the steering turn-back in parallel parking is set. The front wheels 28f, which is the steered wheel, is set to the steering angle for after the steering turn-back.

The driver maintains the set steering angle and reverses the vehicle 30 while referencing a rear projection line g. When the driver observes that an indicator e (vehicle rear line) becomes substantially parallel to the parking space E as shown in FIG. 5(f), the driver stops the vehicle 30. In other words, the driver stops the vehicle 30 when the parking target position P4 has been reached. The fifth step corresponds to the second turning step of the present invention.

A rear projection line g extends in a direction in which the vehicle 30 is projected to travel. The direction in which the vehicle 30 is projected to travel can be obtained from, for example, the steering angle of the steering device 24.

The above-mentioned steps perform parallel parking of the vehicle 30 in the parking space E. In an instance where there is a need to finely adjust the position in the longitudinal direction within the parking space E, the driver operates the steering device 24 or otherwise moves the vehicle 30. Preferably, the vehicle rear line e and the rear projection line g continue to be displayed, in which case the steering device 24 can be operated so that the two indicators overlap and the steering device 24 thereby returned to a neutral position.

A change on a screen displayed on the monitor 20 during each step will now be described with reference to FIGS. 6 through 14. In the present embodiment, on a screen displayed on the monitor 20 shown in each of FIGS. 6 through 14, a peripheral image is displayed as a mirror image. The peripheral image depends on the direction of image capture by the camera 12, and is equivalent to, for example, an image visible when the driver looks rearwards. Meanwhile, as shown in FIG. 1, the monitor 20 is provided in front of the driving seat; therefore, the driver sees a rearward peripheral image displayed on the monitor 20 while facing forwards. Therefore, the peripheral image is displayed as a mirror image so that the actual direction of the parking space E matches the direction of the parking space E on the displayed screen in terms of the lateral direction relative to the driver.

The driver advances further forward of the reversing start position P2 shown in FIG. 3, and stops the vehicle so as to be adequately clear, in the lateral direction, of the parked vehicle 41, which represents an obstacle. The driver operates the touch panel 23 and initiates parking support for parallel parking, and at the same time, operates the shift lever 25 to shift to reverse. Either of the touch panel 23 or the shift lever 25 may be operated before the other. In an instance where there is provided a switch for inputting an instruction to initiate parking support at a location other than the touch panel 23, the switch is operated to initiate parking support. Although in the present embodiment, the operation initiates parking support for parallel parking, the operation may instead merely initiate parking support, wherein another operation is performed to select parallel parking.

Figure 6:
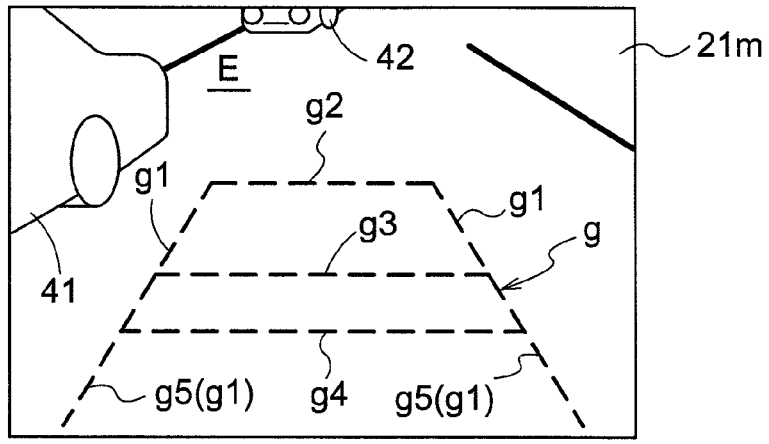
FIG. 6 is a view showing an example of a display on a display portion.
Figure 7:
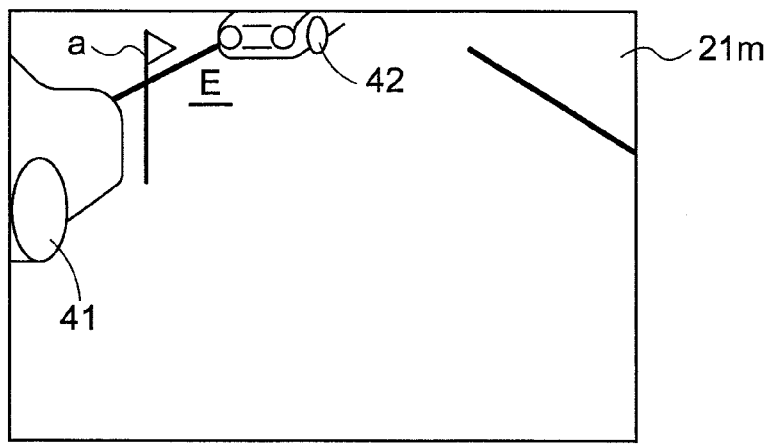
FIG. 7 is a view showing an example of a display on the display portion.

FIG. 6 shows an example of a display on the display portion 21 in the above-mentioned state; in other words, when the vehicle 30 is stationary slightly further forward of the reversing start position P2, the shift lever 25 has been shifted to reverse, and parking support has been initiated. In other words, FIG. 6 shows a state immediately before the above-mentioned first step.

Upon receiving a detection result from the shift position sensor 15 indicating that the shift lever 25 has been shifted to reverse, the ECU 10 displays the peripheral image captured by the camera 12 onto the display portion 21 of the monitor 20 via the display control portion 3. Also, the rear projection line g generated by the indicator output portion 6 is superimposed on the peripheral image via the display control portion 3. The rear projection line g is an indicator for showing a projected trajectory of a rear end of the vehicle 30, and other lines, according to the steering angle of the reversing vehicle 30. In FIG. 6, the vehicle 30 is positioned along a straight line linking the position P1 and the position P2 shown in FIG. 3; therefore, the steering device 24 is in the neutral position, and the rear projection line g is superimposed directly behind the vehicle 30. In the present embodiment, the rear projection line g comprises a rear end projected trajectory line g1 for showing a projected trajectory of the rear end of the vehicle 30, and distance reference lines g2, g3, g4 for indicating distances rearward of the vehicle 30. In the present example, the distance reference lines comprise a 5-meter reference line g2, a 3-meter reference line g3, and a 1-meter warning line g4. The rear projection line g is generally displayed in yellow. However, the 1-meter warning line g4, and a portion g5 of the rear end projected trajectory line nearer the vehicle 30 than the 1-meter warning line g4, are displayed in red in order to alert the driver. Superimposition of the rear projection line g is performed in order to notify the driver that the ECU 10 has initiated parking support, and is removed after a predetermined time of, for example, about two to five seconds. Another indicator a, described below, is then newly superimposed.

The ECU 10 issues, through the speaker 22, an audible message such as one that says "Parking support for parallel parking is initiated. Please reverse until the vertical guide line meets the rear end of the adjacent vehicle". At this point, the indicator a such as that shown in FIG. 7, and an indicator b are displayed in the display portion 21. The indicator a, which is perpendicular to a road, and a horizontal indicator b for showing a side of the parking space E facing the road, are superimposed on the peripheral image.

In an instance where the vehicle 30 has been stopped rearward of the reversing start position P2, the vertical indicator a cannot be brought to a suitable position by reversing. In such an instance, the driver initially causes the vehicle 30 to advance, then operates the touch panel 23 and the shift lever 25 and reverses to bring the vertical indicator a to the suitable position.

Figure 8:
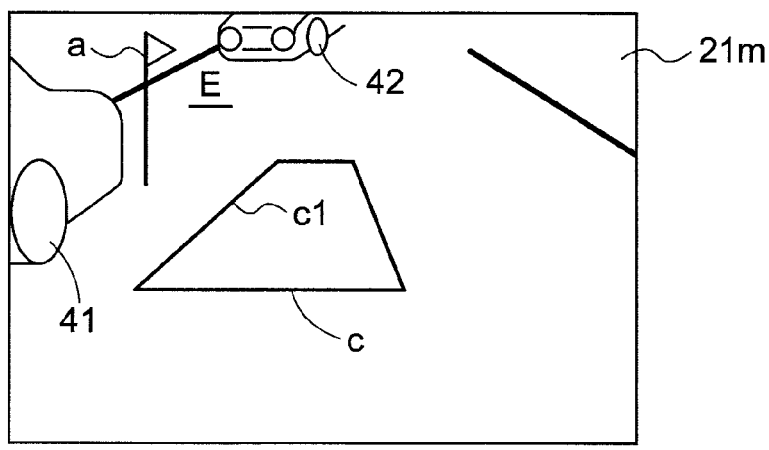
FIG. 8 is a view showing an example of a display on the display portion.
Figure 9:
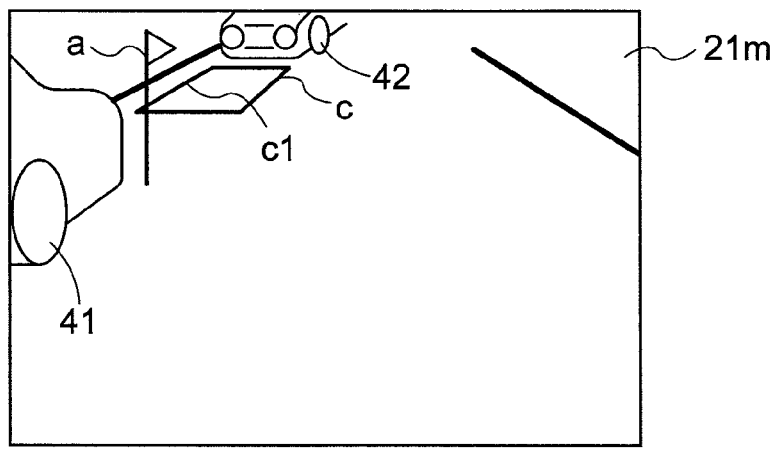
FIG. 9 is a view showing an example of a display on the display portion.

When a predetermined time of, for example, three to five seconds, has elapsed after the vehicle 30 has been reversed and brought to a stop according to the vertical indicator a, the ECU 10 determines that the first step is complete. Alternatively, the ECU 10 determines that the first step is complete upon detecting that the steering device 24 has been operated. Then, a rectangular indicator c is superimposed on the peripheral image, as shown in FIG. 8. The indicator c represents a parking area line for the vehicle 30 to be contained in the parking space E, and is displayed in blue. At a point at which guidance based on the vertical indicator a is complete, the steering device 24 of the vehicle 30 is in a neutral position. As a result, at a start of the second step, the parking area line c is displayed at a center of the peripheral image, or in other words, substantially directly behind the vehicle 30.

The ECU 10 issues, through the speaker 22, an audible message such as one that says "Please turn the steering wheel to the left so that the rectangular parking area line matches the parking space". FIG. 9 again shows an example of a display on the display portion 21 during the second step, and shows a state in which the steering device 24 has been operated so that the parking area line c matches the parking space E.

Figure 10:
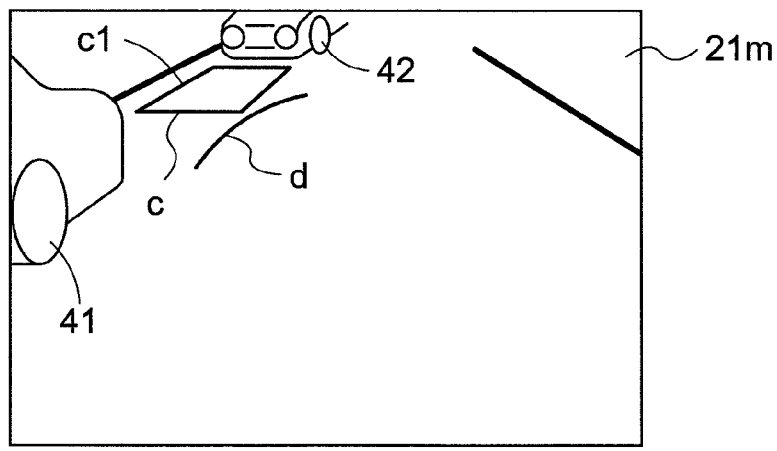
FIG. 10 is a view showing an example of a display on the display portion.

When the steering angle remains unchanged, or in other words, no operation is performed on the steering device 24, for a predetermined time of, for example, three to five seconds, the ECU 10 determines that the parking area line c has been matched to the parking space E. Then, a new indicator d (i.e., the steering turn-back line) is superimposed on the peripheral image as shown in FIG. 10. The steering turn-back line d is an indicator used as a reference for maintaining the steering angle set during the second step and reversing the vehicle 30, and is displayed in blue. The steering turn-back line d coincides with a portion of the rear end projected trajectory line g1, and indicates a projected trajectory of the vehicle 30 in an instance where the steering device 24 is turned back to a substantially maximum steering angle. In the present example, guidance is provided so that the steering turn-back line d is displayed as an arc, and the vehicle 30 is reversed until the steering turn-back line d reaches a far side of the parking area line c, or in other words, a side c1 of the parking area line c shown in FIGS. 9 and 10.

In an instance where the driver releases the brake pedal 27 and begins to reverse immediately after matching the parking area line c to the parking space E, the ECU 10 determines, without waiting for the predetermined time to elapse, that the second step is complete and the workflow has proceeded to the third step.

When the workflow proceeds to the third step, the ECU 10 issues, through the speaker 22, an audible message such as one that says "Please maintain the steering position and reverse until the indicator comes into contact with the hard shoulder". When a predetermined time has elapsed after the vehicle 30 begins to reverse, the ECU 10 determines that the third step is complete, and proceeds to processing of the fourth step.

Figure 11:
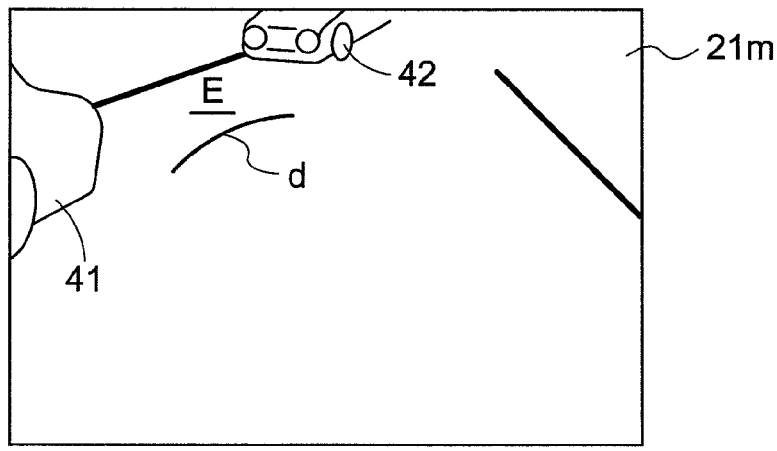
FIG. 11 is a view showing an example of a display on the display portion.
Figure 12:
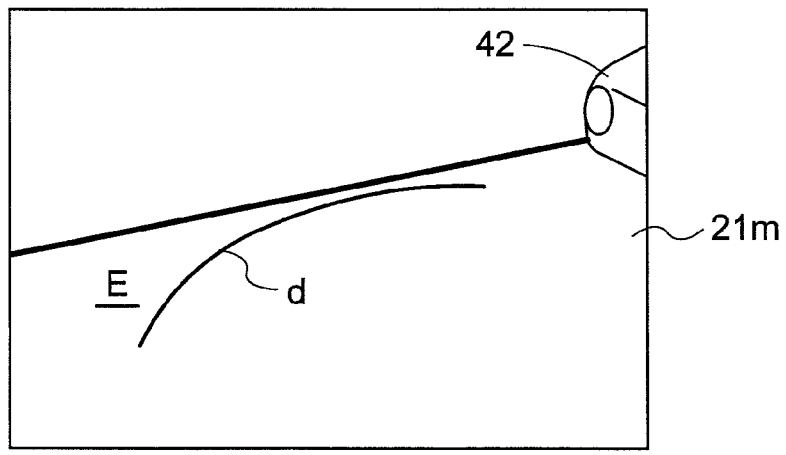
FIG. 12 is a view showing an example of a display on the display portion.

In the fourth step, the parking area line c is removed as shown in FIG. 11. The driver follows the guidance, reverses the vehicle 30 until the hard shoulder, i.e., the side c1 of the parking area line c, comes into contact with the steering turn-back line d, which is the arc-shaped indicator, as shown in FIG. 12, and stops the vehicle. The vehicle 30 is guided to the position P3 shown in FIG. 30 at this time.

When a predetermined time of, for example, three to five seconds, has elapsed after the vehicle 30 is reversed and brought to a stop according to the steering turn-back line d, the ECU 10 determines that the fourth step is complete. Then, the ECU 10 initiates instructions for the fifth step, and issues an audible message such as one that says "When the indicator comes into contact with the hard shoulder, please turn back the steering wheel fully in the reverse direction". In an instance where the driver begins to operate the steering device 24 in a reverse direction immediately after stopping the vehicle 30, the ECU 10 determines that the parking target setting portion 4 is complete without waiting for the predetermined time to elapse.

Figure 13:
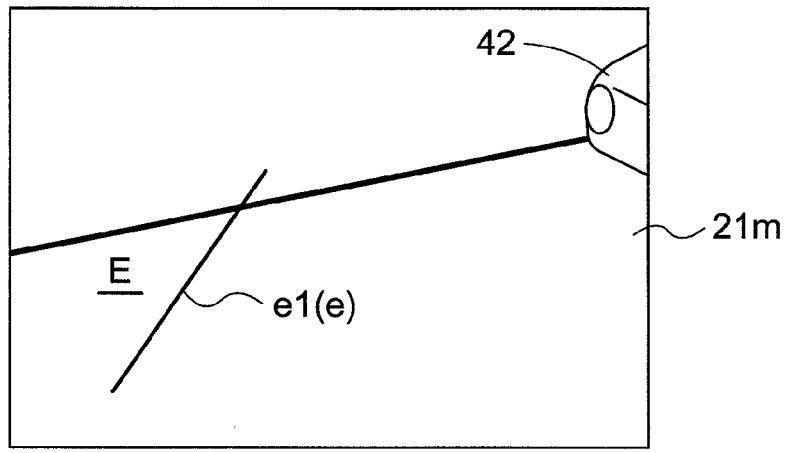
FIG. 13 is a view showing an example of a display on the display portion.

FIG. 13 shows a display on the display portion 21 after the driver fully turns back the steering device 24 in the reverse direction in the fifth step. The ECU 10 superimposes the vehicle rear line e, which is a new indicator, on the peripheral image as shown in FIG. 13. The vehicle rear line e is an indicator showing a predetermined position rearward of the vehicle 30 irrespective of the steering angle of the vehicle 30. The vehicle rear line e is therefore superimposed at a fixed predetermined position on the peripheral image according to an optical relationship with the camera 12 provided to the vehicle 30. Normally, the vehicle rear line e comprises a pair of left and right vehicle width extension lines e1, a 1-meter reference line e2 provided as a distance reference line, and other lines (see FIG. 21). However, in the fifth step, neither the vehicle width extension line e1 on an inside of the turn nor the image acquisition portion 2 are superimposed; instead, only the vehicle width extension line e1 on an outside of the turn, or in other words, nearer the hard shoulder, is superimposedly displayed. As described above, the vehicle rear line e is displayed at a fixed predetermined position on the superimposed image; the vehicle rear line e is an indicator line representing the steering device 24 being in a neutral state, irrespective of the actual state of the steering device 24.

Figure 14:
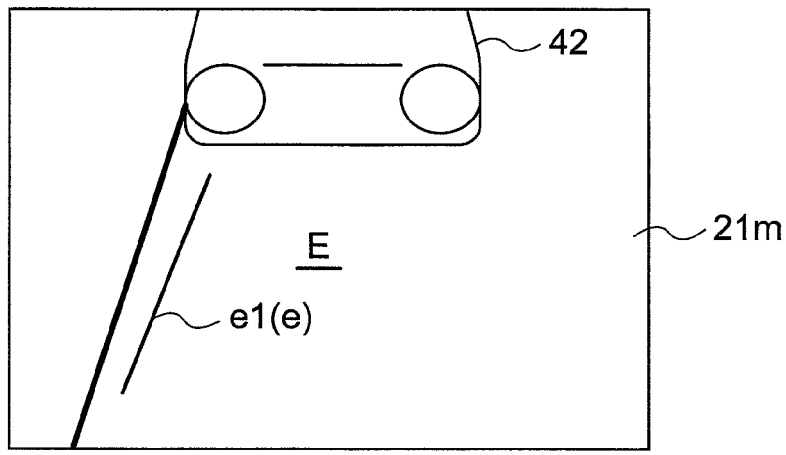
FIG. 14 is a view showing an example of a display on the display portion.

The ECU 10 further issues, through the speaker 22, an audible message such as one that says "Please maintain the steering position and reverse until the indicator comes into contact with the hard shoulder." The driver reverses the vehicle 30 so that the vehicle width extension line e1 on the outside of the turn becomes substantially parallel to the hard shoulder of the parking space E. When the vehicle width extension line e1 on the outside of the turn becomes substantially parallel to the hard shoulder of the parking space E as shown in FIG. 14, the brake pedal 27 is operated and the vehicle 30 is brought to a stop.

When a predetermined time of, for example, three to five seconds has elapsed after the vehicle 30 is brought to a stop, the ECU 10 determines that guidance of the vehicle 30 is complete. The ECU 10 then issues, through the speaker 22, an audible message such as one that says "Parking support is complete", and discontinues parking support.

As described above, out of the left and right vehicle width extension lines e1, only the vehicle width extension line e1 on the outside of the turn is superimposedly displayed, and the indicator that needs to be referenced is thereby made clearer to the driver. As a result, it becomes possible to support the parking operation in an effective manner.

Figure 15:
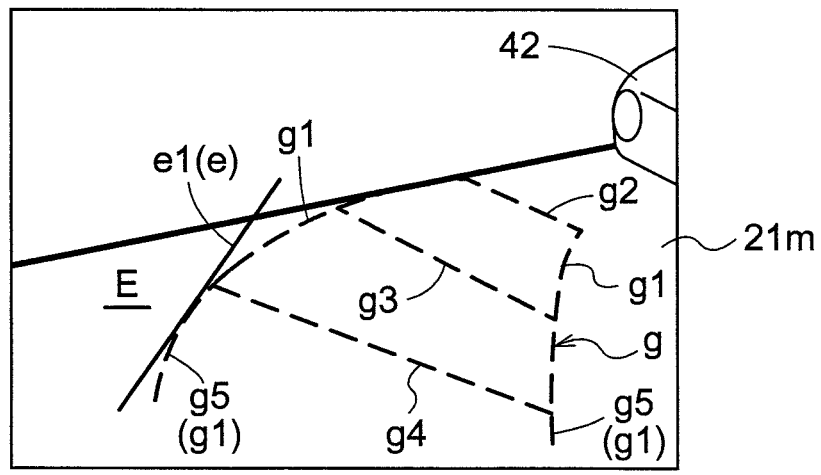
FIG. 15 is a view showing an example of a display on the display portion.
Figure 16:
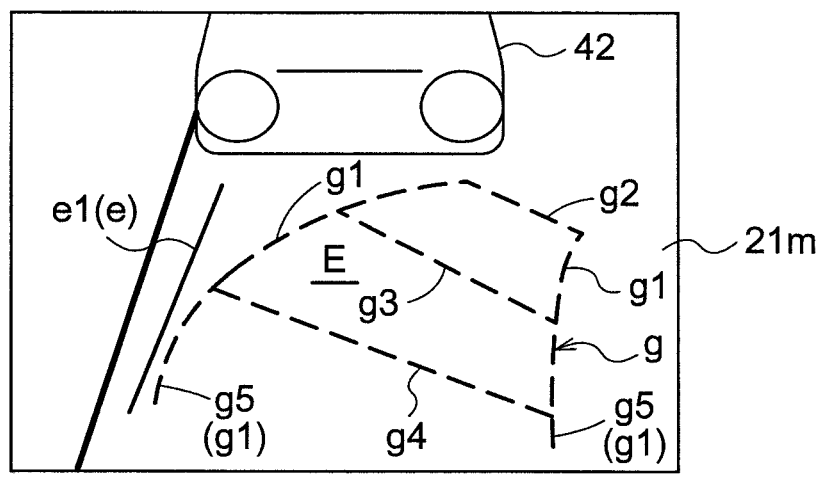
FIG. 16 is a view showing an example of a display on the display portion.

In the fifth step described above, a description was given for an example in which only the vehicle width extension line e1 on the outside of the turn is superimposed. However, in addition to the vehicle width extension line e1 on the outside of the turn, the rear projection line g may also be superimposed as shown in FIGS. 15 and 16. As described above, the rear projection line g is an indicator for showing a projected trajectory of the rear end of the vehicle 30 according to the steering angle of the reversing vehicle 30. In such an instance, the steering device 24 is steered towards the right, and the rear projection line g is therefore displayed in a significantly curved state. In such an instance, the rear projection line g preferably remains superimposed on the peripheral image even after parking support is discontinued. The driver can operate the steering device 24 and the brake pedal 27 to adjust the parking position of the vehicle 30.

Second Embodiment

In the first embodiment, a description was given for an example of a parking support device for performing parking support for parallel parking. However, the present invention can be applied to a parking support device for performing parking support for perpendicular parking. A perpendicular parking procedure guided by the parking support device according to the present embodiment will now be described.

[First Step]

Figure 17:
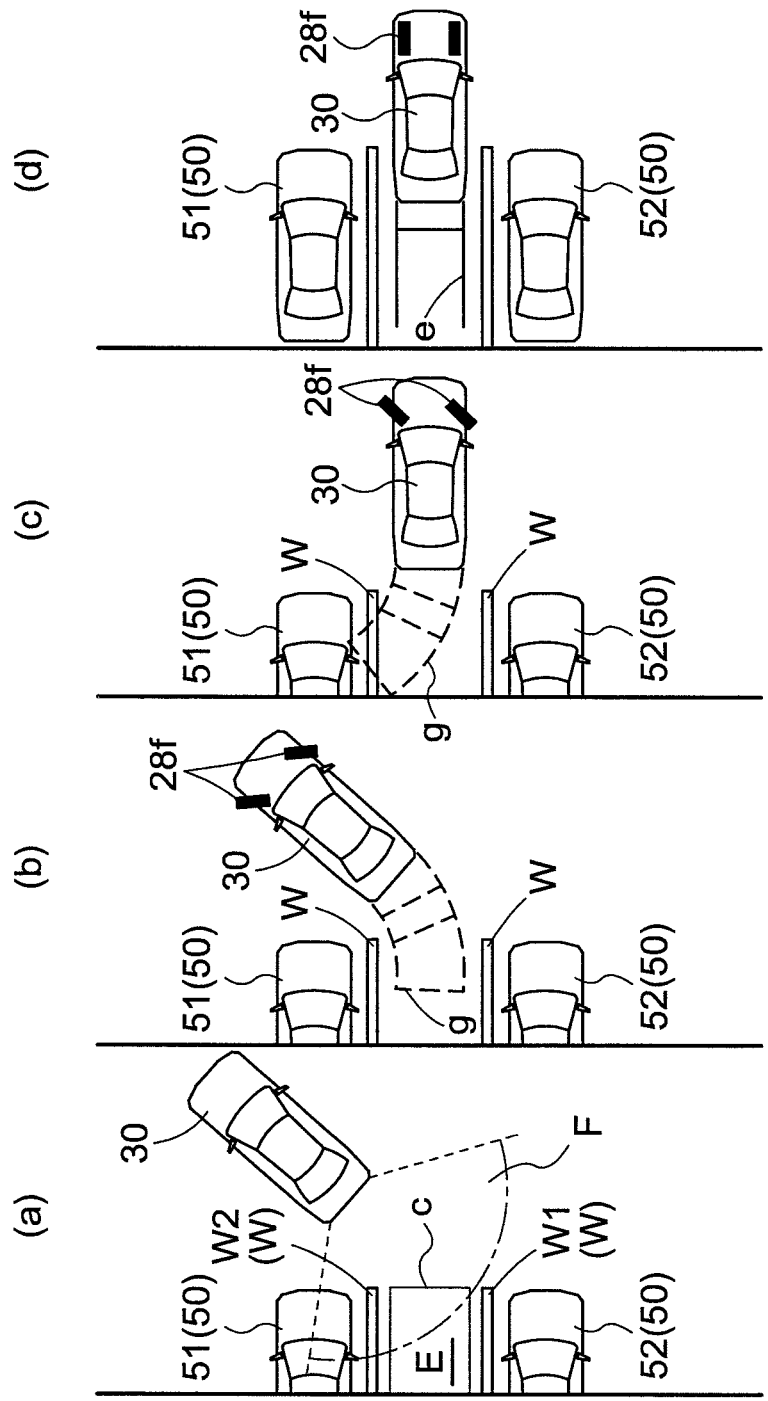
FIG. 17 is a process diagram showing steps of perpendicular parking supported by the parking support device.
Figure 18:
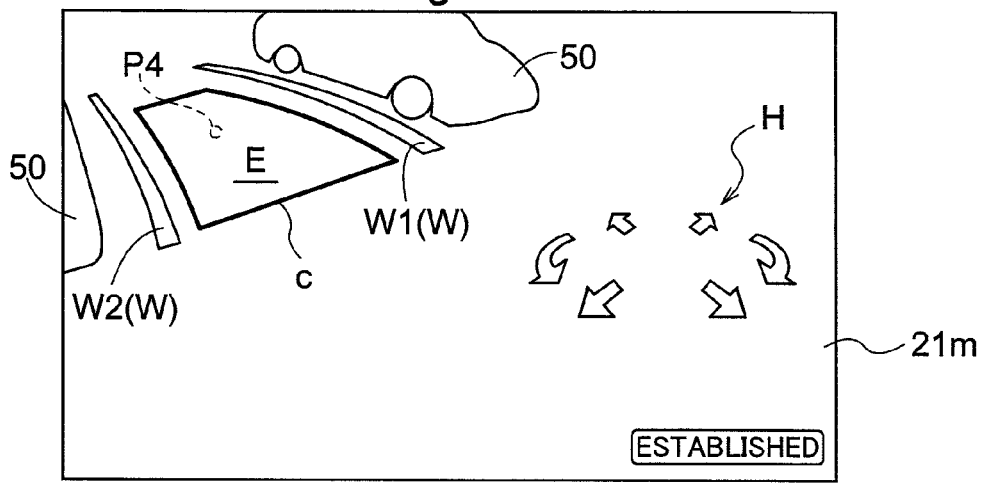
FIG. 18 is a view showing an example of a display on the display portion.

FIG. 17(*a*) is a process diagram showing a first step, and FIG. 18 is a drawing showing the monitor 20 during the first step. In order to reverse the vehicle 30 to park the vehicle 30 in a garage, the driver causes the vehicle 30 to advance in a diagonal forward direction so that the parking space E enters the image capture range F of the camera 12 provided to the rear of the vehicle 30, and stops the vehicle. Here, the steering angle of the vehicle 30 is preferably returned to the neutral position.

In the present embodiment, the calculation portion 1 visually identifies a parking area line W to detect the parking space E and set the parking target position P4. The parking target position P4 can be finely adjusted by the driver. An indicator c representing a parking area line is superimposed, in linkage with the parking target position P4, on the monitor 20. The driver may move the parking area line c using the touch panel 23 or another method to thereby perform fine adjustment. In the present embodiment, an arrow H for adjustment is superimposedly displayed on the screen on the display portion 21. The arrow H moves coordinatedly with the touch panel 23, and the position of the parking area line c can be adjusted based on an operating instruction issued by the driver. The driver operates the touch panel 23 or another method to establish a parking target position (i.e., position of the parking area line c). When the parking target position is established, the driver follows an audible message issued by the speaker 22 and shifts the shift lever 25 to reverse.

[Second Step]

When the shift lever 25 is shifted to reverse, the first step is discontinued and the flow proceeds to the second step. FIG.

Figure 19:
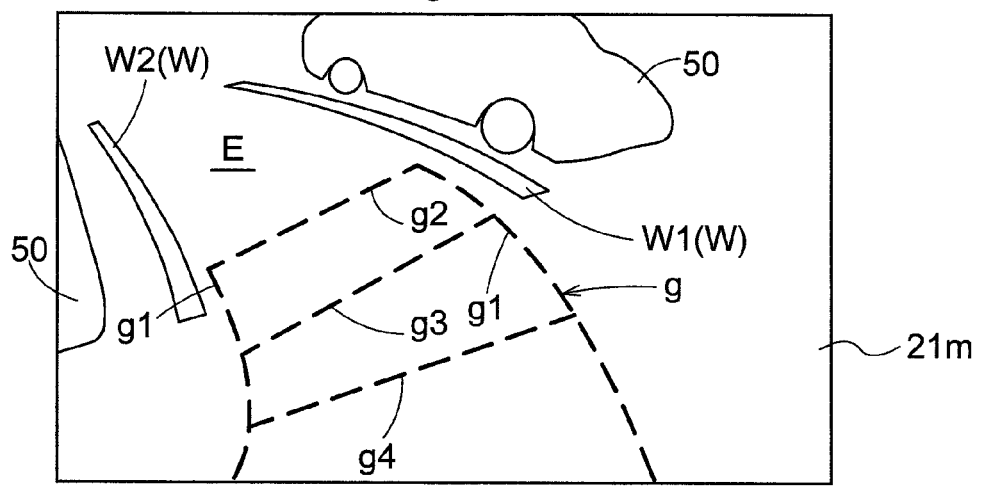
FIG. 19 is a view showing an example of a display on the display portion.

17(b) is a process diagram showing the second step, and FIG. 19 is a drawing showing the monitor 20 during the second step. In the second step, a rear projection line g is superimposed on the peripheral image. As described above, the rear projection line g is an indicator showing the projected trajectory of the rear end of the vehicle 30, and other lines, according to the steering angle of the retreating vehicle 30. The driver steers the steering device 24 while referencing the rear projection line g, reverses the vehicle while performing a turn, and aligns the vehicle 30 to the parking area line W. FIG. 19 shows the monitor 20 after the steering device 24 is steered; the rear projection line g is displayed in a significantly curved state. Here, the second step corresponds to the turn-reversing step of the present invention.

Figure 20:
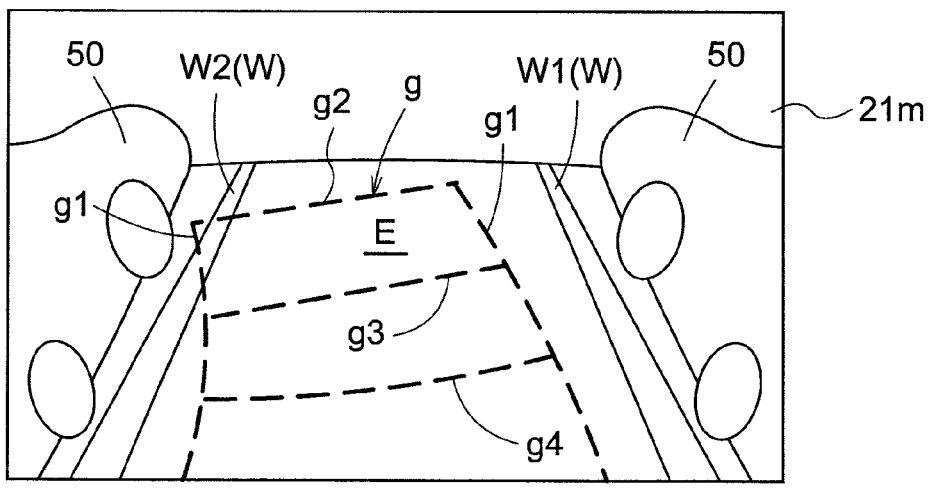
FIG. 20 is a view showing an example of a display on the display portion.

FIG. 17(c) is a process diagram showing a state upon completion of the second step, and FIG. 20 is a drawing showing the monitor 20 upon completion of the second step. At an end of the second step, the vehicle 30 is in a state of being aligned to the parking area line W. As described below, the monitor display switches to that shown in FIG. 21 when the flow proceeds to a third step; therefore, the monitor display in which the vehicle 30 is aligned to the parking area line W and the rear projection line g is displayed, as shown in FIG. 20, is in reality only displayed momentarily.

The flow proceeds from the second step to the third step based on a relative angle between the vehicle 30 and the parking area line W. For example, the ECU 10 may perform image recognition to continually calculate the relative angle between the vehicle 30 and the parking area line W, and cause the flow to proceed from the second step to the third step when the vehicle 30 is aligned to the parking area line W. Alternatively, a change in the relative angle between the vehicle 30 and the parking area line W as a result of the vehicle 30 reversing may be continually calculated in relation to a target parking position set by a user in advance before the reversal, wherein the flow proceeds from the second step to the third step when the vehicle 30 is aligned to the parking area line W. In other words, the flow proceeds from the second step to the third step when the vehicle 30 is aligned with the parking area line W, the flow being capable of proceeding from the second step to the third step regardless of the steering state of the steering device 24. According to such a configuration, the flow proceeds to the third step during the turn in the second step, and the monitor display simultaneously switches to that shown in FIG. 21 as described below. Therefore, it is possible to indirectly notify the driver that the flow has proceeded to the third step.

Figure 21:
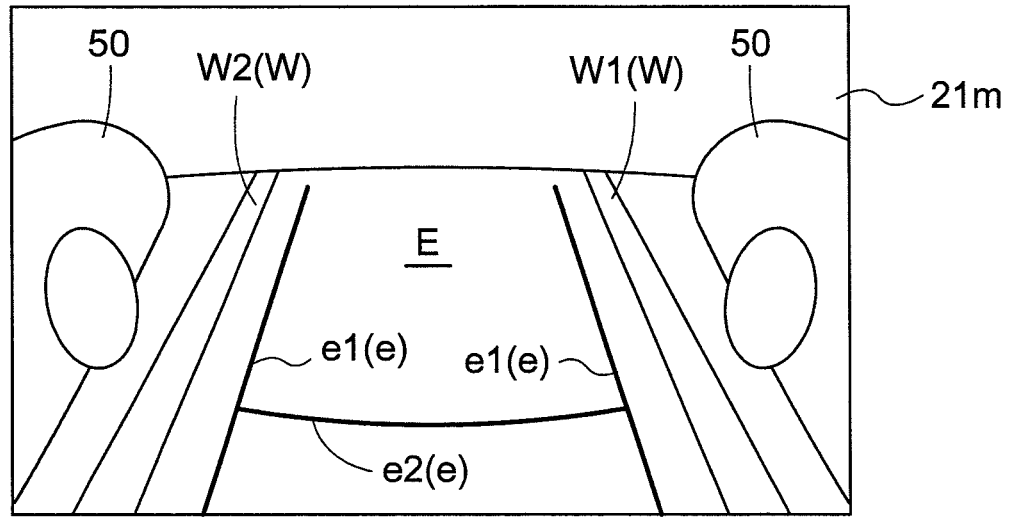
FIG. 21 is a view showing an example of a display on the display portion.

FIG. 17(d) is a diagram showing a process diagram for the third step, and FIG. 21 is a drawing showing the monitor 20 during the third step. A vehicle rear line e is superimposedly displayed in the third step. The vehicle rear line e is an indicator showing a predetermined position rearward of the vehicle 30 irrespective of the steering angle of the vehicle 30. The vehicle rear line e is therefore superimposed at a fixed predetermined position on the peripheral image according to an optical relationship with the camera 12 provided to the vehicle 30. In the present embodiment, the vehicle rear line e comprises a pair of left and right vehicle width extension lines e1 and a 1-meter reference line e2 provided as a distance reference line. In the present embodiment, the switch from the rear projection line g to the vehicle rear line e is performed by detecting that the vehicle 30 is aligned with the parking area line W as described above. The driver reverses the vehicle 30 in a straight line while referencing the rear projection line g and positions the vehicle 30 at the parking target position. The third step corresponds to the linear reversing step of the present invention.

When a predetermined time of, for example, three to five seconds has elapsed after the vehicle 30 is brought to a stop, the ECU 10 determines that guidance of the vehicle 30 is complete. The ECU 10 then issues, through the speaker 22, an audible message such as one that says "Parking support is complete", and discontinues parking support.

As described above, according to the parking support device, in the third step, only the rear projection line g is superimposedly displayed out of the rear projection line g and the vehicle rear line e. Meanwhile, out of the rear projection line g and the vehicle rear line e, only the vehicle rear line e is superimposedly displayed in the third step. In other words, in the second step, it is necessary to reverse the vehicle 30 while adjusting the steering angle and align the vehicle to the parking area line W, the driver must identify the relationship between the steering angle and a path of the vehicle, and the rear projection line g is the indicator that needs to be referenced. In contrast, in the third step, it is necessary to reverse the vehicle 30 while ensuring that the vehicle 30 is contained within the parking area line W, and the vehicle rear line e is the indicator that needs to be referenced. Therefore, only the rear projection line g is superimposedly displayed out of the rear projection line g and the vehicle rear line e in the second step, and only the vehicle rear line e is superimposedly displayed out of the rear projection line g and the vehicle rear line e in the third step, as in the present configuration; the indicator that needs to be referenced is thereby made clearer to the driver. As a result, it becomes possible to support the parking operation in an effective manner.

Figure 22:
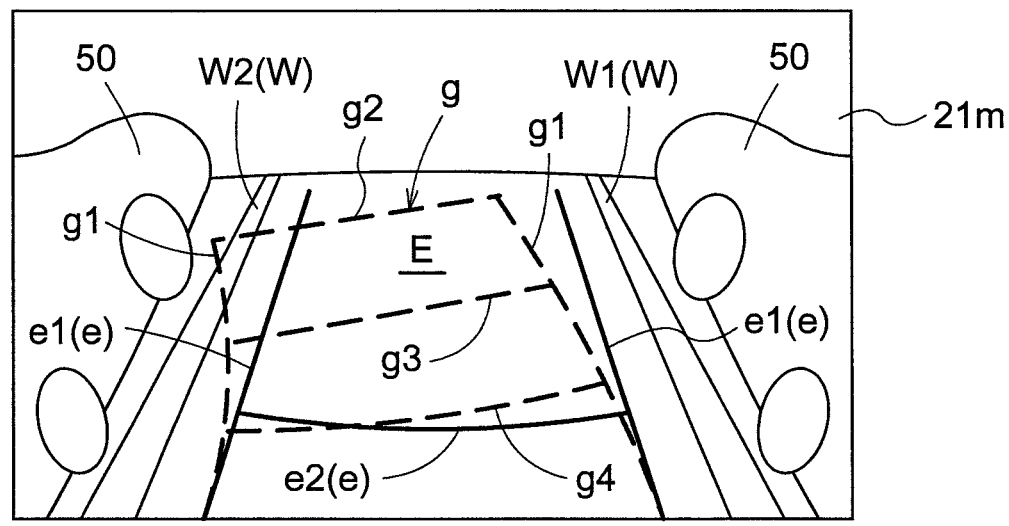
FIG. 22 is a view showing an example of a display on the display portion.

In the example described above, a description was given for an example in which a process of removing the rear projection line g and a process of displaying the vehicle rear line e are performed simultaneously. However, the process of removing the rear projection line g may be performed after the vehicle rear line e is displayed. FIG. 22 shows a display screen of the monitor 20 when the vehicle 30 is in a state shown in FIG. 17(c). In the present example, when the vehicle 30 is aligned to the parking area line W based on the relative angle between the vehicle 30 and the parking area line W, the parking space E is displayed. When the steering angle is subsequently returned to neutral, a process of removing the rear projection line g is performed.

INDUSTRIAL APPLICABILITY

The present invention can be used for a parking support device for supporting a driving operation by a driver when parking a vehicle.

The invention claimed is:

1. A parking support device comprising an image acquisition portion for acquiring an image peripheral to a vehicle captured by a vehicle-mounted image pickup device;
   an image display portion, provided within a vehicle chamber, for displaying the peripheral image; and
   an indicator output portion for superimposedly displaying an indicator, comprising a pair of left and right vehicle width extension lines extending rearwards of the vehicle, on the peripheral image in order to guide a driver during a parking operation by the driver;
   the parking support device supporting parallel parking by the driver, comprising a first turning step, in which the vehicle is reversed while being turned and driven into a parking area, and a second turning step, in which the vehicle is aligned in a parallel direction while being turned in a direction opposite to that in the first turning step;

the indicator output portion superimposedly displaying, during the second turning step, only the vehicle width extension line that is on an outside of the turn out of the left and right vehicle width extension lines,
wherein the vehicle is moved in reverse during the second turning step, and
wherein the vehicle width extension line is an indicator line representing a steering device being in a neutral state.

2. The parking support device according to claim 1, wherein the indicator output portion switches between superimposedly displayed indicators based on a steering angle of the vehicle.

3. The parking support device according to claim 1, wherein the indicator output portion does not superimposedly display the vehicle width extension line among the pair of left and right vehicle width extension lines that is on an inside of a turn.

4. The parking support device according to claim 1, wherein the indicator output portion superimposedly displays, in addition to the above-described vehicle width extension line on the outside of the turn, a rear projection line extending in a direction in which the vehicle is projected to travel.

* * * * *